United States Patent
Green et al.

(10) Patent No.: US 11,201,043 B2
(45) Date of Patent: Dec. 14, 2021

(54) OPTIMISED TARGETED ANALYSIS

(71) Applicant: Micromass UK Limited, Wilmslow (GB)

(72) Inventors: Martin Raymond Green, Bowdon (GB); Jason Lee Wildgoose, Stockport (GB); Keith Richardson, High Peak (GB)

(73) Assignee: Micromass UK Limited, Wilmslow (GB)

(*) Notice: Subject to any disclaimer, the term of this patent is extended or adjusted under 35 U.S.C. 154(b) by 104 days.

(21) Appl. No.: 16/604,538

(22) PCT Filed: Apr. 11, 2018

(86) PCT No.: PCT/GB2018/050968
§ 371 (c)(1),
(2) Date: Oct. 10, 2019

(87) PCT Pub. No.: WO2018/189540
PCT Pub. Date: Oct. 18, 2018

(65) Prior Publication Data
US 2021/0125816 A1    Apr. 29, 2021

(30) Foreign Application Priority Data
Apr. 12, 2017 (GB) .................................. 1705908

(51) Int. Cl.
*H01J 49/00* (2006.01)
*G01N 30/72* (2006.01)

(52) U.S. Cl.
CPC ...... *H01J 49/0031* (2013.01); *G01N 30/7233* (2013.01); *H01J 49/0045* (2013.01)

(58) Field of Classification Search
CPC .............. H01J 49/0031; H01J 49/0036; H01J 49/0045; G01N 30/7233
See application file for complete search history.

(56) References Cited

U.S. PATENT DOCUMENTS 7,158,862 B2 * 1/2007 Liebier ............... H01J 49/0036
  250/281
8,278,620 B2 * 10/2012 Schwartz ............ H01J 49/0045
  250/282

(Continued)

FOREIGN PATENT DOCUMENTS

EP    2660589 A1   11/2013
EP    2685487 A1   1/2014

(Continued)

OTHER PUBLICATIONS

Search Report for United Kingdom Application No. GB1705908.0, dated Oct. 6, 2017, 4 pages.

(Continued)

*Primary Examiner* — Sean M Luck
(74) *Attorney, Agent, or Firm* — Kacvinsky Daisak Bluni PLLC (57) ABSTRACT

A method of mass spectrometry is disclosed comprising: a) providing temporally separated precursor ions; b) mass analyzing separated precursor ions, and/or product ions derived therefrom, during a plurality of sequential acquisition periods, wherein the value of an operational parameter of the spectrometer is varied during the different acquisition periods; c) storing the spectral data obtained in each acquisition period along with its respective value of the operational parameter; d) interrogating the stored spectral data and determining which of the spectral data for a precursor ion or product ions meets a predetermined criterion, and determining the value of the operational parameter that provides this mass spectral data as a target operational parameter value; and e) mass analyzing again the precursor or product ions whilst the operational parameter is set to the target operational parameter value.

17 Claims, 7 Drawing Sheets

(56) References Cited

U.S. PATENT DOCUMENTS

| | | | | |
|---|---|---|---|---|
| 8,921,773 | B2* | 12/2014 | Geromanos | H01J 49/0031 250/282 |
| 9,667,302 | B2* | 5/2017 | Winiecki | H04B 17/11 |
| 2004/0113062 | A1* | 6/2004 | Norton | G01N 30/8668 250/282 |
| 2009/0212209 | A1* | 8/2009 | Quarmby | H01J 49/005 250/283 |
| 2013/0080073 | A1* | 3/2013 | de Corral | H01J 49/0036 702/23 |
| 2013/0295597 | A1* | 11/2013 | DeWitte | G01N 35/08 435/23 |
| 2014/0326875 | A1* | 11/2014 | Asano | H01J 49/0009 250/288 |
| 2015/0102219 | A1 | 4/2015 | Yamamoto | |
| 2016/0027626 | A1* | 1/2016 | Chapman | H01J 49/0036 250/282 |
| 2016/0027628 | A1* | 1/2016 | Green | G06F 17/18 250/282 |
| 2017/0011899 | A1 | 1/2017 | Moulds et al. | |

FOREIGN PATENT DOCUMENTS

| | | |
|---|---|---|
| EP | 2782116 A1 | 9/2014 |
| EP | 2819148 A2 | 12/2014 |
| EP | 3086114 A1 | 10/2016 |
| KR | 20140036734 A | 3/2014 |
| WO | 2011010649 A1 | 1/2011 |

OTHER PUBLICATIONS

International Search Report and Written Opinion for International Patent Application No. PCT/GB2018/050968, dated Jul. 12, 2018, 46 pages.

* cited by examiner

OPTIMISED TARGETED ANALYSIS

CROSS-REFERENCE TO RELATED APPLICATIONS

This application is a national phase filing claiming the benefit of and priority to International Patent Application No. PCT/GB2018/050968, filed on Apr. 11, 2018, which claims priority from and the benefit of United Kingdom patent application No. 1705908.0 filed on Apr. 12, 2017. The entire contents of these applications are incorporated herein by reference.

FIELD OF THE INVENTION

The present invention relates generally to mass spectrometers and in particular to methods and spectrometers that optimise the analysis of selected species.

BACKGROUND

In targeted analysis, a method development stage is performed and then an analysis stage is subsequently performed on a target species. In the method development stage, where reference standards may be used, it is known to infuse or loop-inject solutions of reference standards and to then analyse the standards under a range of different mass spectrometer conditions to determine the optimum settings of the spectrometer for both precursor and product ions. The choice of suitable product ions to be monitored for may also be determined during this method development stage. This can be time consuming and does not produce information about chromatographic retention time for each target, which must be subsequently determined during a chromatographic separation.

In a data dependent acquisition (DDA), spectra acquired under a first operational state of the spectrometer are interrogated, during an acquisition, and the instrument is then periodically switched into one or more different operational state based on the information within these spectra. One example of a DDA application is a discovery proteomics application, in which peptides from an enzymatic digest of proteins are analysed by MS-MS and the resulting product ion spectra are used to identify which proteins are present based on a database search. In this application, low collision energy precursor spectra (i.e. MS spectra) are interrogated to determine one or more target precursor ion for analysis in a subsequent MS-MS mode. Once the target precursor ion(s) is determined the instrument is switched to the MS-MS mode, in which a quadrupole mass filter is set to mass selectively transmit only ions having the mass to charge ratio of the target precursor ion. These ions are then dissociated in a collision or reaction cell and the resulting ions mass analysed so as to record the product ion spectra. Once sufficient MS-MS data has been recorded, the system is switched back to MS mode. Quadrupole Time-of-Flight mass spectrometers (Q-ToF) are one type of system commonly used in this application.

However, in this type of discovery DDA experiment, no reference standard compounds are available. As there may potentially be many thousands of precursor ions present, this presents a challenge in efficiently determining the optimum collision energy for each of the precursor ions. During this type of DDA application, in the MS-MS mode it is known to scan the collision energy over a suitable range so as to produce MS-MS spectra that are then averaged over the collision energy range. The collision energy range may be determined by factors such as the mass to charge ratio and/or charge state of the precursor ion selected.

After interrogating the MS-MS data in a post-processing step, a list of target m/z values is generated for subsequent targeted quantitative analysis. In this application, the protein identifications determined in the DDA experiment are quantified in a subsequent sample by monitoring the relative intensity of characteristic peptide products and/or precursors in a targeted multiple reaction monitoring (MRM) analysis. The collision energy used to produce the target product ions is scanned over a predetermined range while the targeted MS-MS data is acquired, so as to ensure a reasonable level of fragmentation. However, this results in the sensitivity during targeted quantification being compromised.

SUMMARY

The present invention provides a method of mass spectrometry comprising:

a) chromatographically separating compounds in an analytical sample and ionising the eluting sample and/or separating precursor ions, so as to provide temporally separated precursor ions;

b) mass analyzing each of the separated precursor ions, and/or product ions derived therefrom, during a plurality of sequential acquisition periods so as to obtain mass spectral data, wherein the value of one or more operational parameter of the spectrometer is varied such that it has different values during the different acquisition periods, and wherein the spectral data obtained for a given ion varies depending on the value of said operational parameter;

c) storing the spectral data obtained in each acquisition period along with its respective value of said one or more operational parameter used in obtaining the data;

d) interrogating the stored spectral data for at least one of the precursor ions, or the product ions derived therefrom, and determining which of the spectral data for that precursor ion or for at least one of its product ions meets a predetermined criterion, and determining the value of each of said one or more operational parameter that provides this mass spectral data as a target operational parameter value; and e) mass analyzing again said at least one of the precursor ions, or product ions derived therefrom, wherein during this analysis the value of said one or more operational parameter is set to its respective target operational parameter value for said at least one precursor ion, or said at least one of its product ions.

The spectral data considered to meet said predetermined criterion may be the spectral data for the precursor ion, or for at least one of its product ions, that has the greatest intensity or signal to noise ratio.

Although the predetermined criterion has been described as being based on the greatest signal intensity or signal to noise ratio, it may be based on one or more other desirable criteria.

The step of chromatographically separating the compounds may comprise separating the sample by liquid chromatography or separating the precursor ions by ion mobility or mass to charge ratio.

The precursor ions may be fragmented or reacted prior to step b) above and step b) may comprise mass analysing the resulting product ions.

Step d) above may comprise interrogating the spectral data for a plurality of product ions of a precursor ion, determining which of the product ions has mass spectral data meeting the predetermined criterion, and determining the value of each of said one or more operational parameter that provides said this mass spectral data as said target value.

The one or more operational parameter may comprise the fragmentation or reaction energy or rate with which the precursor ions are fragmented or reacted to produce the product ions; or the length of time that the precursor ions are subjected to fragmentation of reaction conditions with a reactant.

The one or more operational parameter may be one or more of: a potential difference used to accelerate the ions; a collision energy with which the ions are caused to collide with a gas or surface; a source ionisation efficiency or sensitivity or ionisation energy; an operational parameter of an ion mobility filter, such as compensation voltage in a differential ion mobility filter; a gas pressure or gas composition; a setting of an electrostatic or RF device acting on the ions, such as a tuning parameter; an ion attenuation level; an electron multiplier setting; a mass filter resolution setting such as for optimum signal to noise ratio or sensitivity; or an ion trapping time.

Steps b) to e) above may be performed for at least some or all of the precursor ions.

The method may comprise using a separator device to perform step a) above; determining the respective elution times of said at least one precursor ion from said separator device; correlating the target operational parameter related to said at least one precursor ion with its respective elution time; separating said precursor ions in step e) above using the, or a, separator device; and controlling the one or more operational parameter during step e) above as a function of elution time from the separator so that as said at least one precursor ion elutes from the separator device the operational parameter is at the respective target value for said at least one precursor ion.

The method may comprise using a separator device to perform step a) above; wherein the step of storing the spectral data comprises storing the spectral data along with its respective elution time from the separator.

Storing the spectral data may comprise storing the spectral data for the product ions along with their respective precursor ion mass to charge ratio.

The method may be a DDA method.

The method may comprise mass analysing precursor ions to obtain precursor ion mass spectral data; determining from said precursor ion mass spectral data one or more precursor ions for subsequent analysis; isolating said one or more precursor ions; and fragmenting or reacting said one or more isolated precursor ions to produce product ions, wherein steps b) to e) above are performed on the product ions.

The step of isolating may be performed by mass filtering precursor ions or mass selectively ejecting precursor ions from an ion trap, so that only said one or more precursor ions is transmitted for said subsequent analysis.

The method may comprise using a separator device to perform step a) above; repeatedly alternating between first and second modes as analyte elutes from the separator, wherein in the first mode the precursor ions are subjected to fragmentation or reaction conditions such that a relatively low proportion or no precursor ions dissociate, and in the second mode the precursor ions are subjected to fragmentation or reaction conditions such that a relatively high proportion or all precursor ions dissociate to form product ions; mass analysing ions in the first mode; and performing steps b) to d) above on the product ions produced in the second mode.

The method may comprise determining the mass to charge ratio and/or elution time of one or more precursor ion of interest from the mass spectral data obtained in the first mode; and determining, from the mass spectral data obtained in the second mode, the target operational parameter value for a product ion of each of said one or more precursor ion of interest.

The one or more operational parameter may be multiple operational parameters, and in step b) the values of said multiple operational parameters may be varied.

The method may comprise repeating steps a) to d) whilst varying different operational parameters so as to determine target operational parameter values for the different operational parameters; and setting the multiple operational parameters to their respective target operational parameter values in step e).

The method may comprise filtering or separating ions by mass to charge ratio or ion mobility prior to step b) so as to transmit a restricted range of mass to charge ratios or ion mobilities to be mass analysed in step b) at any given time.

The value of the operational parameter may be varied in step b) within a range; wherein this range is varied with time; wherein the restricted range of mass to charge ratios or ion mobilities is varied with time, optionally in synchronism with the variation of the range of the operational parameter.

The mass analysis may be time of flight mass analysis.

As described above, the method may be a DDA method.

Therefore, the present invention also provides a method of mass spectrometry comprising:

(i) mass analysing precursor ions to obtain precursor ion mass spectral data;

(ii) determining from said precursor ion mass spectral data a precursor ion for subsequent analysis;

(iii) isolating said precursor ion;

(iv) fragmenting or reacting the isolated precursor ion to produce product ions, and mass analyzing the product ions during a plurality of sequential acquisition periods so as to obtain mass spectral data, wherein the value of one or more operational parameter of the spectrometer is varied such that it has different values during the different acquisition periods, and wherein the spectral data obtained for a given ion varies depending on the value of said operational parameter;

(v) storing the spectral data obtained in each acquisition period along with its respective value of said one or more operational parameter used in obtaining the data;

(vi) interrogating the stored spectral data and determining which of the spectral data meets a predetermined criterion, and determining the value of each of said one or more operational parameter that provides this mass spectral data as a target operational parameter value; and then (vii) fragmenting or reacting said precursor ion and mass analysing the resulting product ions, whilst the value of said one or more operational parameter is set to the target operational parameter value.

Prior to step (i) the method may comprise chromatographically separating compounds in an analytical sample and ionising the eluting sample to provide the precursor ions and/or separating the precursor ions, so as to provide temporally separated precursor ions.

Step (ii) may comprise identifying multiple precursor ions of interest. Steps (iii) to (vii) may then be performed on each of the multiple precursor ions of interest separately.

It is contemplated that the step of providing temporally separated precursor ions may be omitted.

As such, the present invention also provides a method of mass spectrometry comprising:

b) mass analyzing precursor ions, and/or product ions derived therefrom, during a plurality of sequential acquisition periods so as to obtain mass spectral data, wherein the value of one or more operational parameter of the spectrometer is varied such that it has different values during the different acquisition periods, and wherein the spectral data obtained for a given ion varies depending on the value of said operational parameter;

c) storing the spectral data obtained in each acquisition period along with its respective value of said one or more operational parameter used in obtaining the data;

d) interrogating the stored spectral data for at least one of the precursor ions, or the product ions derived therefrom, and determining which of the spectral data for that precursor ion or for at least one of its product ions meets a predetermined criterion, and determining the value of each of said one or more operational parameter that provides this mass spectral data as a target operational parameter value; and e) mass analyzing again said at least one of the precursor ions, or product ions derived therefrom, wherein during this analysis the value of said one or more operational parameter is set to its respective target operational parameter value for said at least one precursor ion, or said at least one of its product ions.

The present invention also provides a mass spectrometer set up and configured to perform any one of the methods described herein.

Accordingly, the present invention also provides a mass spectrometer comprising:

a mass analyser;

a controller for varying one or more operational parameter of the spectrometer; and a processor set up and configured to:

control the mass analyser to mass analyse each of the precursor ions, and/or product ions derived therefrom, during a plurality of sequential acquisition periods so as to obtain mass spectral data;

control said controller to vary the one or more operational parameter of the spectrometer such that it has different values during the different acquisition periods, wherein the spectral data obtained for a given ion varies depending on the value of said operational parameter;

store the spectral data obtained in each acquisition period along with its respective value of said one or more operational parameter used in obtaining the data;

interrogate the stored spectral data for at least one of the precursor ions, or the product ions derived therefrom, and determine which of the spectral data for that precursor ion or for at least one of its product ions meets a preselected or threshold criterion, and determine the value of each of said one or more operational parameter that provides this mass spectral data as a target operational parameter value; and control the spectrometer to mass analyse again said at least one of the precursor ions, or product ions derived therefrom, wherein during this analysis the value of said one or more operational parameter is set to its respective target operational parameter value for said at least one precursor ion, or said at least one of its product ions.

The mass analyser may be a time of flight mass analyser.

The spectrometer may comprise a separation device for chromatographically separating compounds and an ion source for ionising the eluting sample, and/or a separation device for separating precursor ions; wherein the processor is set up and configured to control the mass analyser to mass analyse each of the separated precursor ions, and/or product ions derived therefrom, during said plurality of sequential acquisition periods so as to obtain the mass spectral data.

The spectrometer may comprise a fragmentation or reaction device for fragmenting or reacting said precursor ions to form said product ions.

An embodiment of the present invention comprises a method of recording MS-MS data at several different collision energies during a data dependent acquisition (DDA) MS-MS analysis using a q-ToF instrument. In a subsequent post-processing step, the DDA data is interrogated to discover target precursor and product ions for subsequent targeted quantification. The m/z of the precursors, m/z of the products, collision energies and retention times (RT) are determined from the DDA data and then used in a subsequent targeted analysis. This ensures that the optimum sensitivity is achieved for each target precursor to product transitions monitored.

The spectrometer disclosed herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; and (xxix) a Surface Assisted Laser Desorption Ionisation ("SALDI") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The ion-molecule reaction device may be configured to perform ozonlysis for the location of olefinic (double) bonds in lipids.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii) about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) >about 500 V peak to peak.

The AC or RF voltage may have a frequency selected from the group consisting of: (i) <about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) >about 10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <about 0.0001 mbar; (ii) about 0.0001-0.001 mbar; (iii) about 0.001-0.01 mbar; (iv) about 0.01-0.1 mbar; (v) about 0.1-1 mbar; (vi) about 1-10 mbar; (vii) about 10-100 mbar; (viii) about 100-1000 mbar; and (ix) >about 1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

A chromatography detector may be provided, wherein the chromatography detector comprises either: a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

An embodiment of the invention will now be described in which a sample is analysed by data dependent acquisition (DDA) MS-MS analysis. A sample is separated, for example by a liquid chromatography (LC) device, and then ionised as it elutes so as to form precursor ions. Alternatively, it is contemplated that the sample may be ionised so as to form precursor ions and then the precursor ions separated according to a physicochemical property such as ion mobility or mass to charge ratio. It is also contemplated that the sample may be separated, e.g. by an LC device, ionised to form precursor ions and then the precursor ions separated according to a physicochemical property such as ion mobility or mass to charge ratio.

The method is first operated in an MS mode in which the precursor ions are mass analysed. This mass spectral data is then interrogated to determine one or more target precursor ions for analysis in a subsequent MS-MS mode. Once the one or more target precursor ions is determined, the instrument is switched to an MS-MS mode in which a mass filter (e.g. a quadrupole mass filter) is set so as to mass selectively transmit a narrow range of mass to charge ratios centred on a first of the one or more target precursor ions, and to filter out other ions. The mass filter transmits the first target precursor ion, which is then transmitted into a fragmentation or reaction device, such as a collision cell, so as to fragment or react these ions so that they dissociate to form product ions. The fragmentation or reaction energy or rate that the first target precursor ions are subjected to may be varied with time (e.g. continuously scanned or discontinuously stepped). The resulting product ions (including any unfragmented precursor ions) are then mass analysed and the mass spectral data recorded as a function of the fragmentation or reaction energy or rate used to generate the ions. As such, mass spectra may be obtained for the first target ion for a plurality of different fragmentation or reaction energies or rates (e.g. to produce a nested MS-MS-Collision Energy spectrum). This spectral data may be recorded as being associated with the first precursor ion.

If more than one target precursor ion has been identified, then the mass filter may then be operated so as to mass selectively transmit a second of the target precursor ions into the fragmentation or reaction device so as to fragment or react these ions so that they dissociate to form product ions. As above, the fragmentation or reaction energy or rate that the second target precursor ions are subjected to may be varied with time (e.g. continuously scanned or discontinuously stepped). The resulting ions are then mass analysed and the mass spectral data recorded as a function of the fragmentation or reaction energy or rate used to generate the ions. As such, mass spectra may be obtained for the second target ion for a plurality of different fragmentation or reaction energies or rates. This spectral data may be recorded as being associated with the second precursor ion.

If more than two target precursor ions have been identified, this process may be repeated for each of the further target precursor ions. Once sufficient MS-MS data has been recorded, the system may be switched back to the MS mode. A Quadrupole Time-of-Flight mass spectrometers (Q-ToF) may be used to perform the method.

The MS-MS data obtained may be interrogated and a list of target m/z values may be selected for subsequent targeted quantification (discovery). The targets may be precursor to product MRM transitions that correspond to analytes of interest. A candidate list of precursor-product ion combinations can be determined in this step. For example, in a discovery proteomics application the protein identifications determined in this stage may identify peptides that are characteristic of the presence of specific proteins. These may be quantified in a subsequent sample by monitoring the relative intensity of the characteristic peptide products and/or precursors in a targeted multiple reaction monitoring (MRM) analysis.

During the processing of the MS/MS data to determine targets for quantification, the fragmentation or reaction energy or rate used to generate the product ion data may be ignored (e.g. the nested spectra may be collapsed in the fragmentation or reaction energy or rate dimension for each MS-MS spectrum). Once the list of target m/z values has been generated, the nested spectral data may be interrogated to determine, for each precursor ion, which of its product ions (i.e. which m/z) has the optimum ion signal and to determine the fragmentation or reaction energy or rate that produces the optimum ion signal for this product ion. This may be used to refine the list of target m/z values, e.g. by excluding transitions that do not include the product ions having the optimum ion signal. Alternatively, this process may be performed when drawing up the initial list of target m/z values, rather than ignoring the fragmentation or reaction energy or rate data.

A subsequent chromatographic analysis may then be performed in which the precursor ions are fragmented or reacted as they elute from the separation device. The time at which any given precursor ion elutes is known, and so when a given precursor ion elutes the fragmentation or reaction energy or rate may be selected to produce the optimum product ion signal for that precursor ion. As such, the fragmentation/reaction energy or rate may be fixed for any given precursor ion, thus ensuring maximum sensitivity for the product ion producing the optimum signal.

It may be desired to optimise or enhance the ion signal for multiple product ions of a given precursor ion. The nested spectral data may be interrogated to determine the optimum fragmentation/reaction energies or rates for these multiple product ions. In the subsequent analysis, when the precursor ion elutes, the fragmentation/reaction energy or rate may be varied between these multiple optimum fragmentation/reaction energies or rates (e.g. by being varied over a narrow range).

Figure 7:
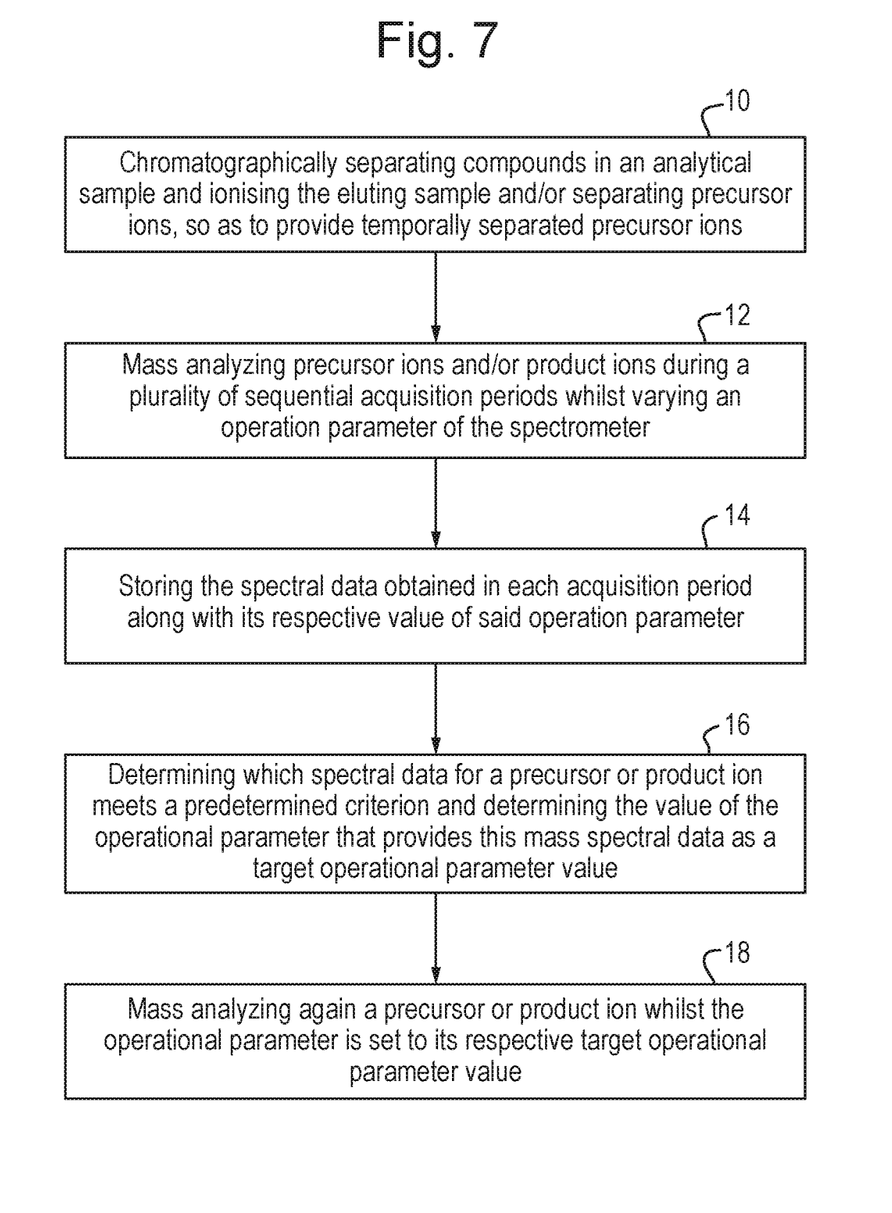
FIG. 7 shows a flow chart illustrating an exemplary DDA method according to an embodiment of the present invention.

FIG. 7 is a flow chart illustrating an exemplary DDA method according to an embodiment of the present invention. The method includes a step 10 of chromatographically separating compounds in an analytical sample and ionising the eluting sample and/or separating precursor ions, so as to provide temporally separated precursor ions. The method then comprises a step 12 of mass analyzing precursor ions, and/or product ions derived therefrom, during a plurality of sequential acquisition periods so as to obtain mass spectral data, wherein the value of one or more operational parameter of the spectrometer is varied such that it has different values during the different acquisition periods, and wherein the spectral data obtained for a given ion varies depending on the value of said operational parameter. The method then comprises a step 14 of storing the spectral data obtained in each acquisition period along with its respective value of said one or more operational parameter used in obtaining the data. The method then comprises a step 16 of interrogating the stored spectral data for at least one of the precursor ions, or the product ions derived therefrom, and determining which of the spectral data for that precursor ion or for at least one of its product ions meets a predetermined criterion, and determining the value of each of said one or more operational parameter that provides this mass spectral data as a target operational parameter value. The method then comprises a step 18 of mass analyzing again said at least one of the precursor ions, or product ions derived therefrom, wherein during this analysis the value of said one or more operational parameter is set to its respective target operational parameter value for said at least one precursor ion, or said at least one of its product ions.

The above described method is a DDA technique in which nested mass to charge ratio and fragmentation/reaction energy or rate data is produced within a sample separation (e.g. chromatographic separation). However, this technique may be used during other non-DDA types of acquisitions, wherein the information produced is used to determine the optimum instrument conditions for a subsequent target analysis. For example, if a target m/z list is already known, a scheduled MS-MS or MS (single ion recording SIR) analysis may be performed whilst varying the instrument conditions, such as scanning the collision energy, and the data produced may be used to determine optimum conditions for a subsequent experiment. In both these experiments a mass filter may be used to restrict the m/z range monitored.

Alternatively, full MS data may be acquired with no m/z selection whilst scanning and recording the collision energy.

Alternatively, an $MS^e$ mode of operation may be used wherein spectra are acquired in alternating first and second modes as analyte elutes from a separator (e.g. LC device). In the first mode the fragmentation/reaction energy or rate is low (and may be fixed) so that substantially no precursor ions, or a relatively low proportion of precursor ions, dissociate. In the second mode, the fragmentation/reaction energy or rate is varied as described above, so that the ions are dissociated (or a relatively high proportion of precursor ions dissociate) and the resulting spectra recorded as a function of the energy or rate. The data obtained in the first mode may be used to determine the m/z and retention time (in the separator) of precursor ions of interest. The data obtained in the second mode may be used to determine the m/z of characteristic product ions at each retention time and the optimum fragmentation/reaction energy or rate for each product ion. This information may be used in a subsequent targeted analysis in a corresponding manner to that described above, i.e. wherein as a given precursor ion enters the fragmentation or reaction device the fragmentation/reaction energy or rate is set to a value that is optimised for producing the desired product ion. This mode of operation is a data independent acquisition (DIA) mode of operation.

An example of an embodiment will now be described in which the a sample was separated by an LC device and then subjected to a DIA mode of operation. In this example, the sample was separated by UPLC, ionized by electrospray ionization in positive ion mode and then analysed using a quadrupole time of flight instrument. The instrument was set to acquire data in an MS mode with a spectral speed of 4 spe/second over a m/z range of 50-1200 amu. In the fragmentation mode, the precursor ions were accelerated into a collision cell with a collision energy that was scanned from 10-40 eV during each 0.25 s spectral period. During this 0.25 second scan, 200 separate mass spectra were acquired, each spectra containing data obtained at different collision energies. The total rate of collection of individual mass spectra during this experiment was therefore 800 spe/second. The sample analysed contained the following five reference compounds:

| | |
|---|---|
| Sulfaguanidine | [M + H]+ = 215 amu |
| Aqcetaminophen | [M + H]+ = 152 amu |
| ValTyrVal (VYV) | [M + H]+ = 380 amu |
| Leucine Enkephalin | [M + H]+ = 556 amu |
| Sulfadimethoxine | [M + H]+ = 311 amu |

Figure 1:
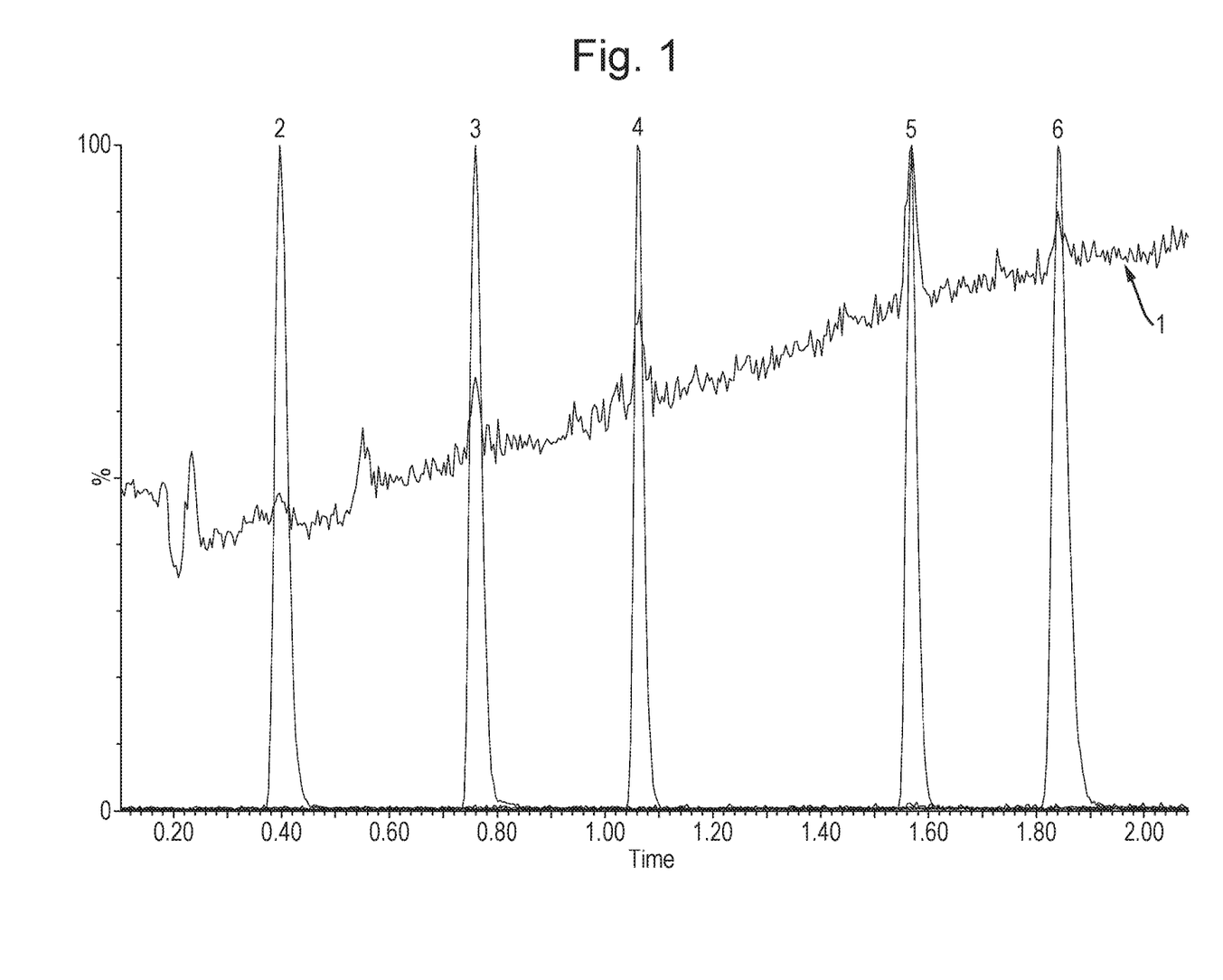
FIG. 1 shows an LC chromatogram of a sample comprising five standards.

FIG. 1 shows the UPLC chromatogram produced. The trace labeled 1 is the total ion current recorded during the experiment. Peaks 2, 3, 4, 5 and 6 are reconstructed mass chromatograms of m/z 215, 152, 380, 556 and 311 respectively. These peaks are the signals from the precursor ions of the five target reference compounds. The amount of reference material on column for each analyte was: Sulfaguanidine—0.5 ng; Aqcetaminophen—1 ng; ValTyrVal (VYV)—0.25 ng; Leucine Enkephalin—0.25 ng; and Sulfadimethoxine—0.1 ng. From this data the retention time for each of the five reference compounds was determined.

Figure 2:
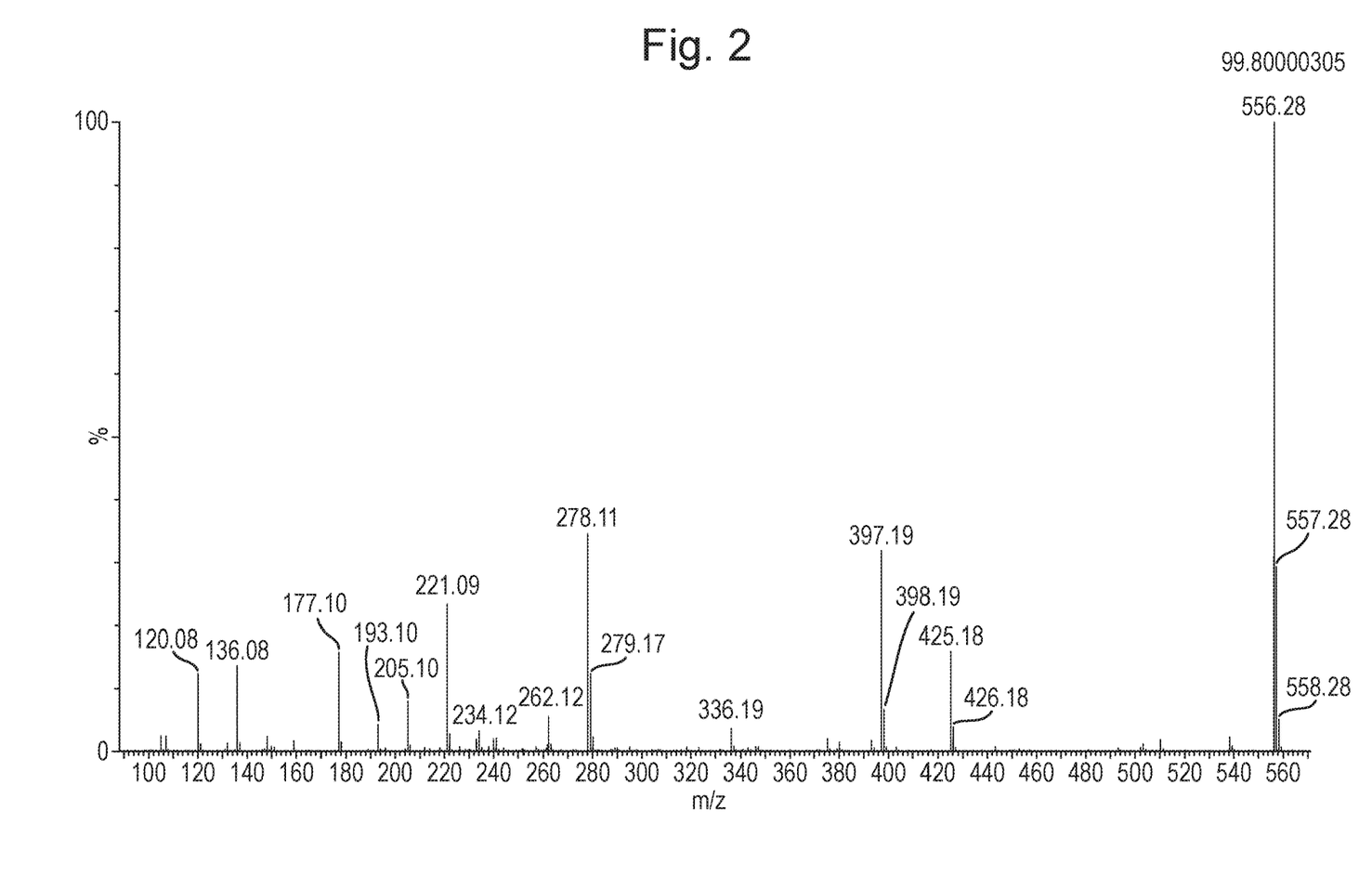
FIG. 2 show a mass spectrum including the precursor ion and product ions for one of the LC peaks in FIG. 1.

FIG. 2 shows the mass spectrum for peak 5 in FIG. 1, corresponding to the elution of Leucine Enkephalin $[M+H]^+$ m/z=556.3 at RT=1.57 min. This spectrum shows the relative abundances of the precursor ion (m/z=556.3) and the major product ions averaged over the linear collision energy scan.

Figure 3A:
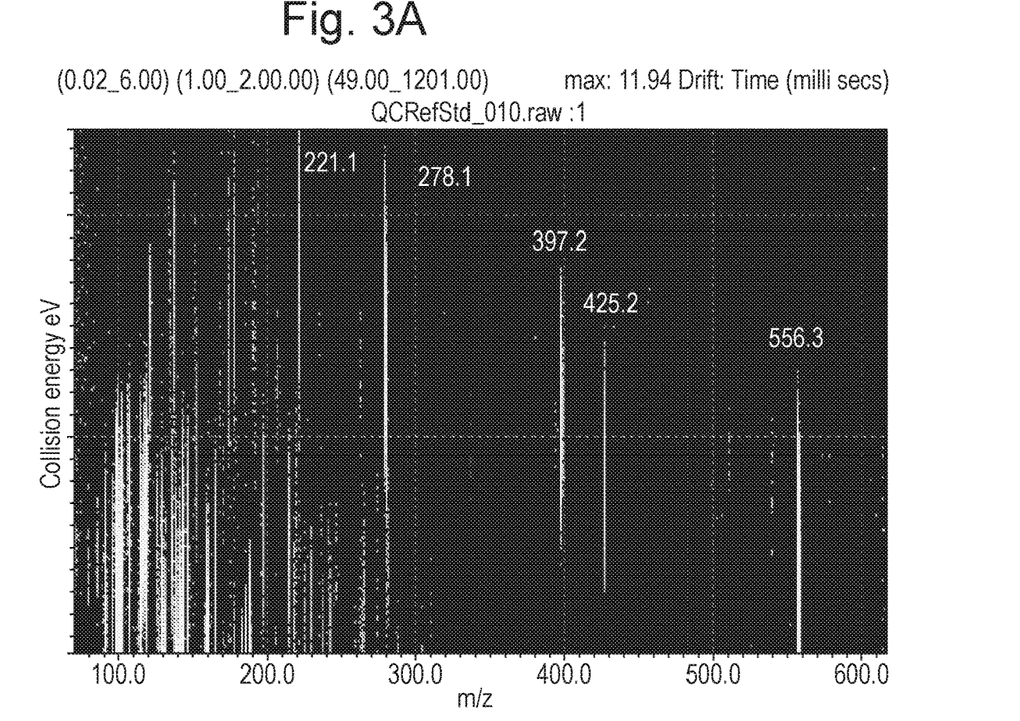
FIGS. 3A and 3B show different representations of the mass spectral data of FIG. 2, as a function of the collision energy used to fragment the precursor ion.
Figure 3B:
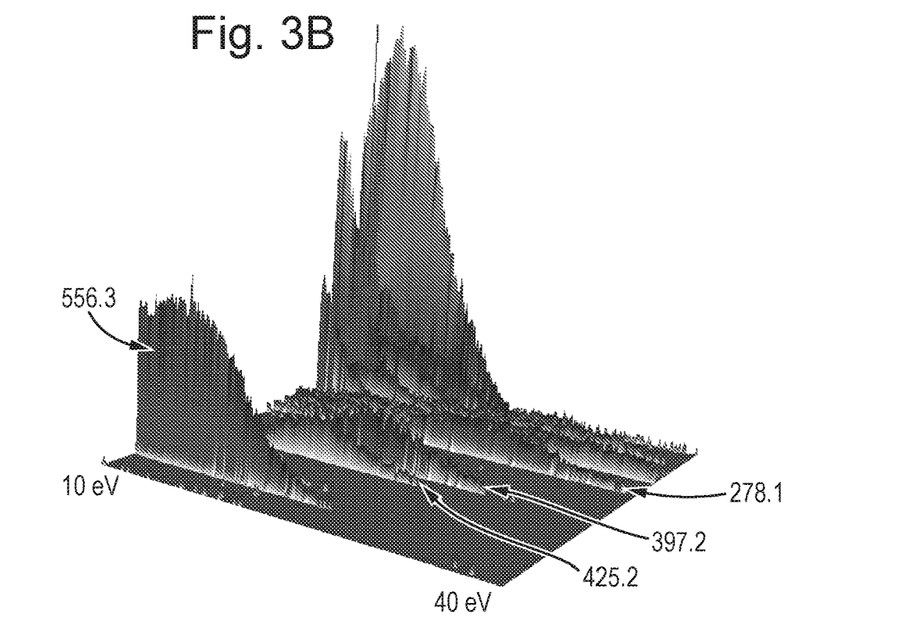

FIG. 3A shows a heat map of collision energy against m/z for the data in FIG. 2. The intensity of the signal is indicated by the brightness of each point in the map. FIG. 3B shows the same data as shown in the heat map of FIG. 3A, except as a three dimensional representation in which the height represents the intensity of the signal.

Figure 4:
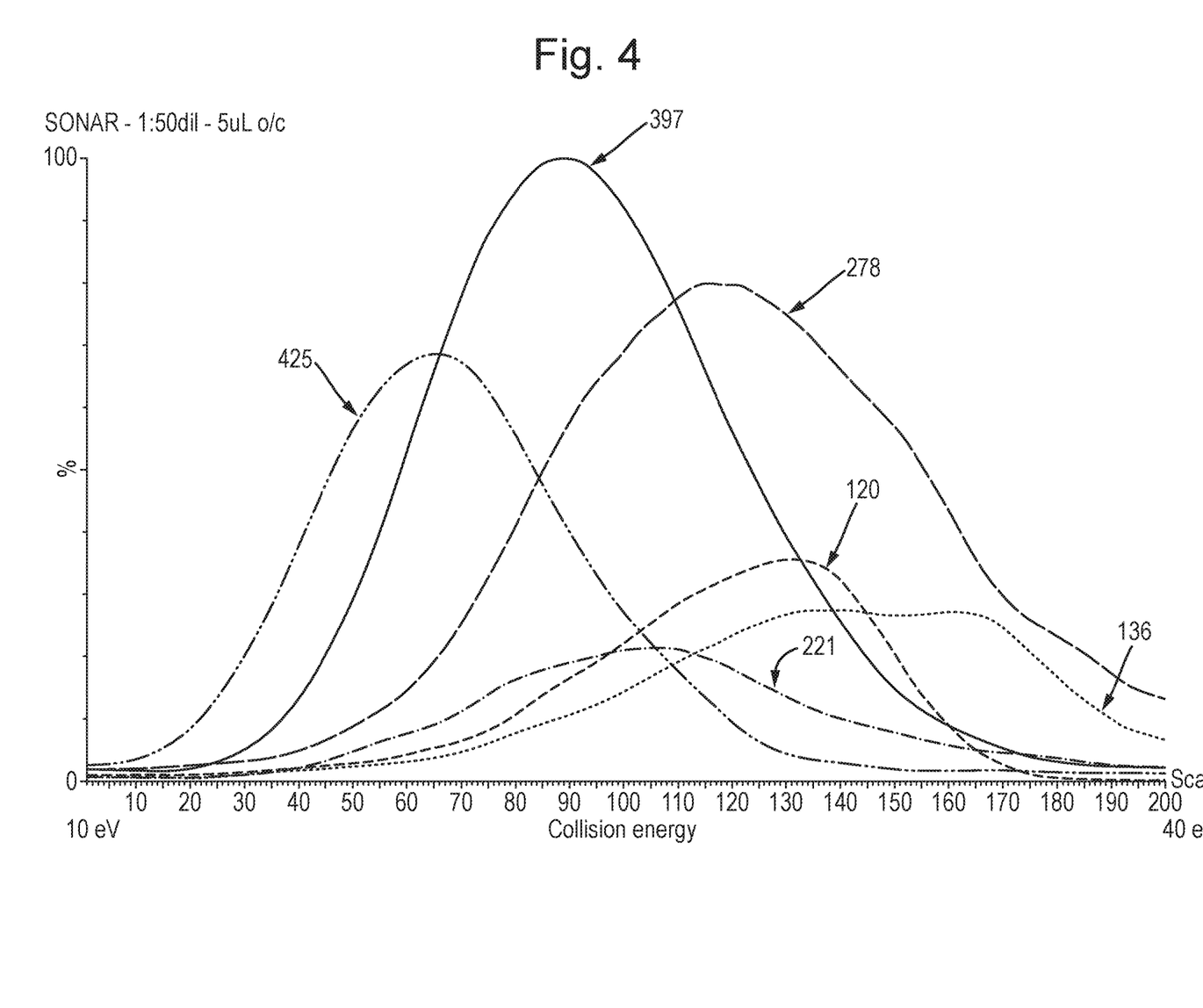
FIG. 4 shows a plot of intensity against collision energy for the major product ions in FIGS. 3A-3B.

FIG. 4 shows a plot of intensity against collision energy for the major product ions of Leucine Enkephalin at the retention time of 1.57 min from FIG. 1. It can be seen from FIG. 4 that the highest intensity signal of any product ion is for the product ion having a m/z=397 and occurs when the collision energy is 23.5 eV. As described above, during each collision energy scan from 10-40 eV, 200 separate mass spectra were acquired in which each spectra contained data obtained at different collision energies. The x-axis in FIG. 4 also shows the spectrum number from 0-200.

Plots similar to FIG. 4 were created for the other reference compounds, i.e. Sulfaguanidine, Acetaminophen, ValTyrVal (VYV) and Sulfadimethoxine. The product ion of the highest intensity signal, together with the respective collision energy at which it was obtained, was recorded for each of these other reference compounds. The results are summarised in the table below.

| Analyte Name | MS-MS Transition | Collision energy (eV) | Retention time (min) |
| --- | --- | --- | --- |
| Sulfaguanidine | 215-156 | 15.6 | 0.40 |
| Acetaminophen | 152-110 | 16.0 | 0.76 |
| Val-Tyr-Val | 380-136 | 26.0 | 1.06 |
| Leucine Enkephalin | 556-397 | 23.5 | 1.57 |
| Sulfadimethoxine | 311-156 | 23.5 | 1.84 |

The first column indicates the reference compound. The second column indicates the transition from the precursor m/z to the product m/z having the highest intensity signal. The third column indicates the collision energy at which the ion signal for the product ion in the second column was maximum. The fourth column indicates the retention time of the reference column in the LC device.

A multiple reaction monitoring (MRM) analysis was then performed using the MS-MS transitions and only the collision energies shown in the table above, i.e. using the optimum product ion signals. The system was run in a target enhancement mode where the chosen product ion for each transition was released to the acceleration region of the orthogonal TOF (pusher) as a series of discreet ion packets. The orthogonal acceleration electrode pulse was synchronized to the release of the ions such that the product ions arrived at the pusher region when the pusher pulse was applied. This maximized the duty cycle of the ToF mass analyser for a specific m/z region centered on each product ion, increasing the target ion sensitivity.

Figure 5:
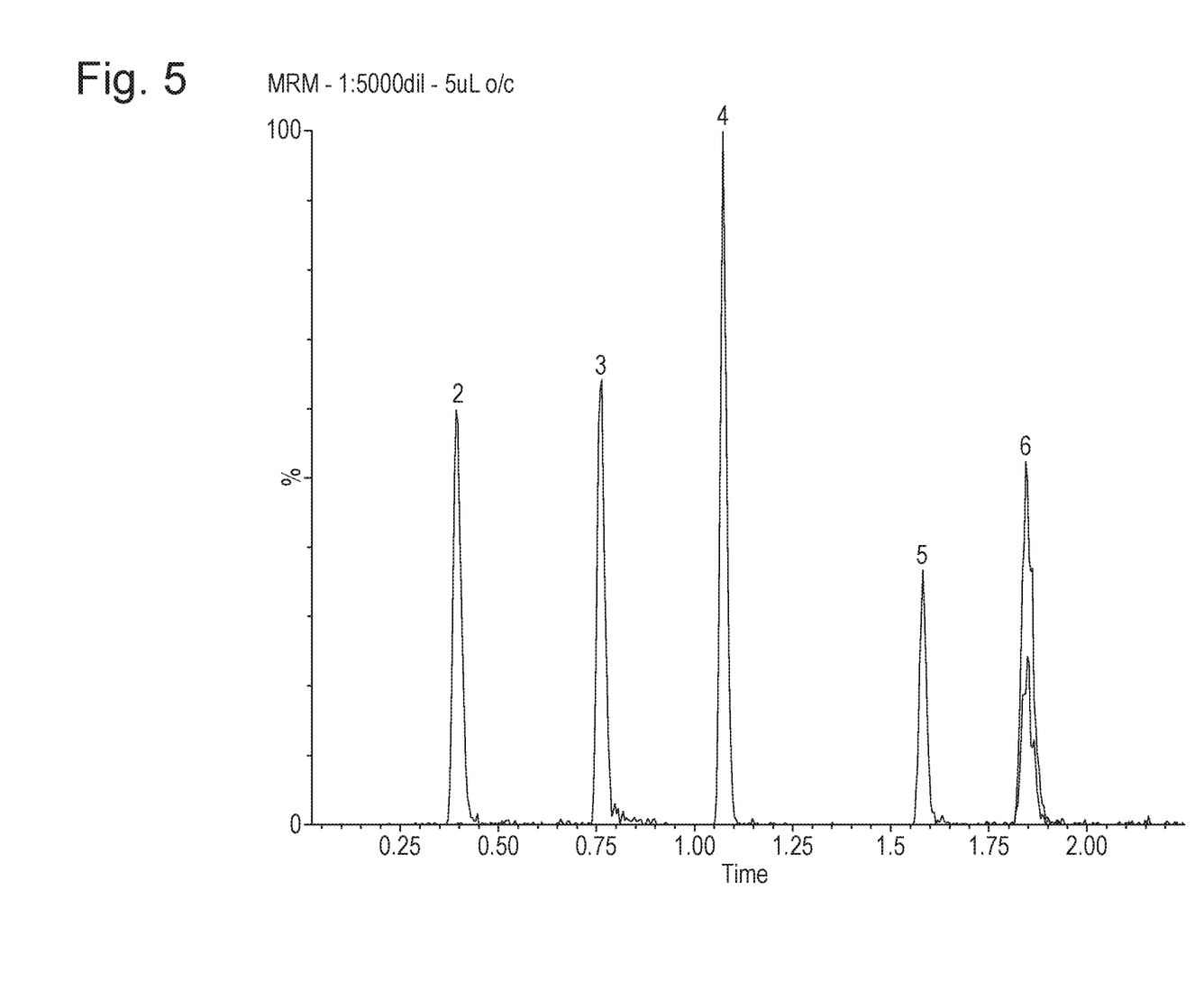
FIG. 5 shows the result of an MRM analysis using the product ion and collision energy from FIG. 4 that provides the optimum ion signal.

FIG. 5 shows the result of the above-described MRM analysis.

The amount of each reference compound injected in this experiment was: Sulfaguanidine—0.5 pg; Aqcetaminophen—1 pg; ValTyrVal (WV)—0.25 pg; Leucine Enkephalin—0.25 pg; and Sulfadimethoxine—0.1 pg (i.e. the compounds were 1000 less concentrated than in the method development step described above).

Figure 6:
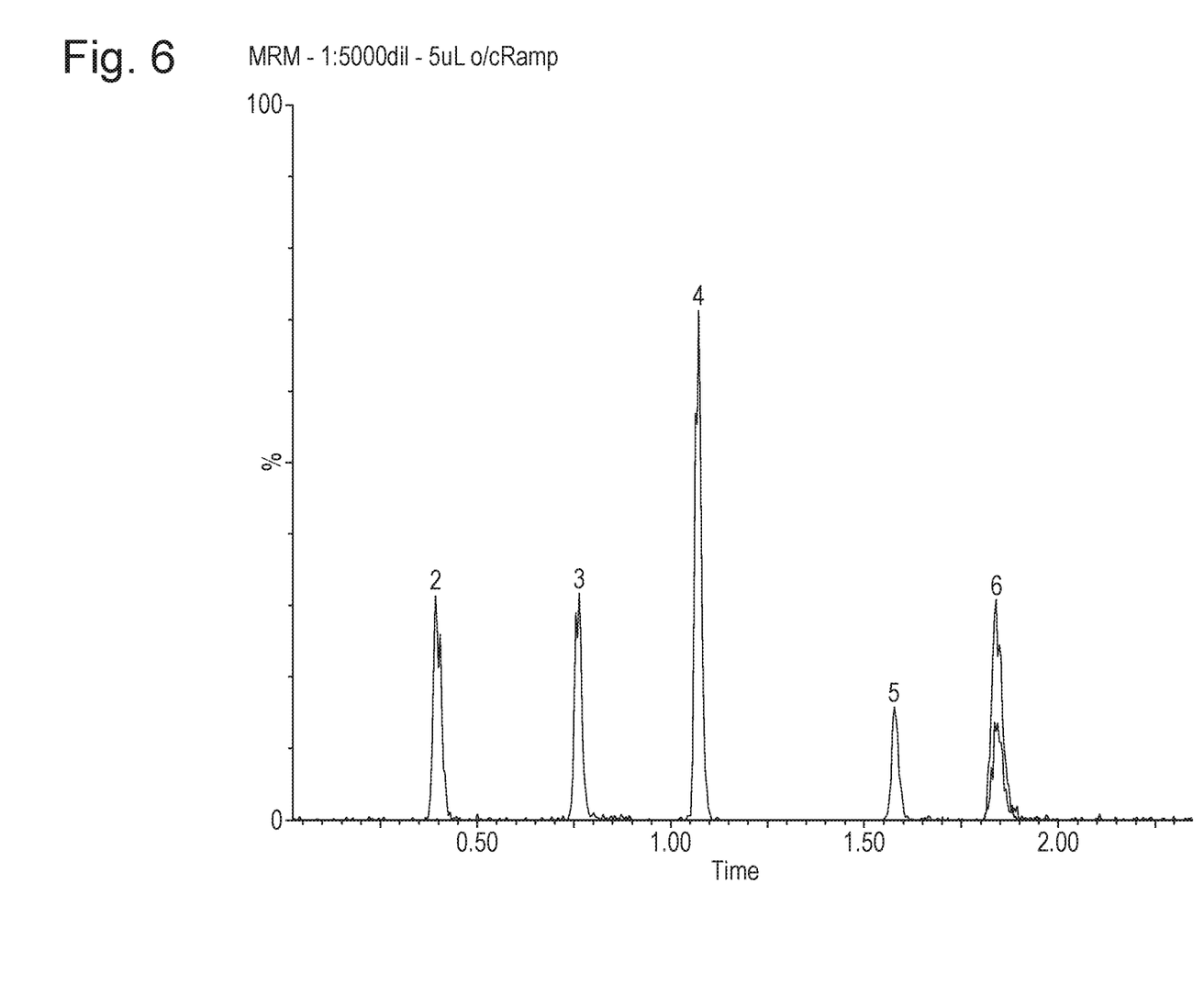
FIG. 6 shows the result of an MRM analysis corresponding to that of FIG. 5, except wherein the collision energy is scanned.

FIG. 6 shows the results of an experiment corresponding to that described in relation to FIG. 5, except wherein the collision energy was scanned from 10-40 eV, as opposed to being set to the determined optimum value for each product ion.

The table below shows a comparison of the chromatographic peak areas for each of the targets in FIGS. 5 and 6.

| Analyte Name | Area Ramped CE | Area fixed CE | Ratio (Fixed/Ramp) |
| --- | --- | --- | --- |
| Sulfaguanidine | 94 | 191 | 2.0 |
| Acetaminophen | 91 | 204 | 2.2 |
| Val-Tyr-Val | 178 | 238 | 1.3 |
| Leucine Enkephalin | 60 | 119 | 2.0 |
| Sulfadimethoxine | 127 | 218 | 1.7 |

The first column indicates the reference compound. The second column indicates the chromatographic peak area obtained according to the technique described in relation to FIG. 6, wherein the collision energy is scanned between 10-40 eV. The third column indicates the chromatographic peak area obtained according to the technique described in relation to FIG. 5, wherein the optimum collision energy is determined and used. The fourth column indicates ratio of area in the third column to the area in the second column. It can be seen that the technique described in relation to FIG. 5 (having the optimum fragmentation energy) provides a greater chromatographic peak area for each compound than the technique described in relation to FIG. 5 (using scanned collision energies). It can be seen from the fourth column that an average absolute sensitivity increase of 1.84 times was obtained by using the method of FIG. 5.

Although the present invention has been described with reference to preferred embodiments, it will be understood by those skilled in the art that various changes in form and detail may be made without departing from the scope of the invention as set forth in the accompanying claims.

For example, in the above described example reference compounds were available and a data independent method was used to collect the collision energy scanning data. However, this same methodology may be applied to data dependent acquisitions (DDA) to generate precursor-product transition data, RT, and optimum collision energy values.

Although the data in the example described above was taken using reference samples in pure solvent, the same methodology may be applied to reference samples in a matrix.

When optimizing collision energy the optimum value may be selected to be the value at which the best sensitivity or signal intensity is achieved. However, it is contemplated that the optimum value can be chosen to optimize something other than sensitivity. For example, the optimum value may be chosen to maximise signal to noise ratio, rather than absolute intensity.

In the embodiments described above the method is used for optimization of the collision energy for MS-MS analysis. However, the optimum values for other instrument parameters or conditions may be determined using the method described herein, e.g. during a chromatographic separation.

A non-exhaustive list of examples of the parameters that may be varied and optimised are as follows:

1. The collision energy with which ions are caused to collide with a gas or surface may be optimised. For example, ions may be oscillated within a gas by an AC voltage so as to cause them to fragment and the frequency or amplitude of this voltage may be optimised.

2. The fragmentation energy with which ions are fragmented may be optimised. For example, if ions are fragmented by being subjected to electromagnetic radiation or photons, the level of radiation or photon energy may be optimised.

3. Ionisation conditions may be optimised. For example, in electrospray ionisation the electrospray needle voltage may be optimised. The value for highest sensitivity is different when using different solvent compositions and therefore at different retention times. For electron impact ionisation (EI), the electron energy may be optimised, as the best sensitivity and signal to noise ratio is compound specific. In some cases the electron energy or ionization potential may be chosen/optimised to discriminate against interference compounds. In photo-ionisation sources such as APPI sources the photon energy or flux may be optimised.

4. Gas pressure or composition in the instrument may be optimised. For example, this may be optimised to control ion mobility separation, e.g. by introduction of dopants, polar or polarisable gases into the ion mobility separation buffer gas.

5. An operational parameter of an ion mobility filter may be optimised. For example, the compensation voltage used in a differential ion mobility filter may be optimised.

6. One or more settings of electrostatic or RF devices acting to affect the transmission of ions as they travel through the mass spectrometer towards the ion detector may be optimised. For example, for very labile compounds the magnitude of focusing, accelerating, deflecting or RF confining potentials can result in undesirable fragmentation at values which are optimal for other compounds. This is a compound specific effect and may be explored using the method described.

7. Analytical filter resolution setting for optimum signal to noise ratio vs sensitivity may be optimised. For example, as the resolution of a quadrupole mass filter is increased the transmission may decrease. Depending on the nature of any interference there may be an optimum filter resolution for best detection limits. This applies to any analytical filter such as, for example, ion mobility or differential ion mobility filters.

8. The resolution of an analytical RF ion trap may be optimised.

9. The resolution of an analytical electrostatic ion trap may be optimised.

10. The reaction time during which the ions are exposed to reactants, e.g. to cause dissociation, may be optimised. Such processes include, for example, ETD, HDX, ECD, PTR, ion-molecule or ion-ion interactions. This may be achieved using a flow through device where the reaction time is adjusted by changing the driving force urging ions through the device or a trapping time within the device. Alternatively, such reactions may occur in the ionization source or even in solution prior to ionization.

11. A transmission or attenuation level of ions may be optimised.

12. The detector or electron multiplier voltage or gain may be optimised.

It is contemplated herein that the optimum value of more than one instrument parameter may be determined within a single chromatographic run. Data from the instrument under different conditions of more than one operational parameter may be acquired individually during separate chromatographic runs or effectively simultaneously in the same chromatographic run. In the latter approach two or more functions may be acquired during the experiment. For example, one acquisition period may contain data from multiple values of parameter A with all other parameters fixed. The next acquisition period may contain data from multiple values of parameter B with all other parameters (including parameter A) fixed. In this way the data may be subsequently interrogated to determine the optimised values of both parameters A and B from a single chromatographic run.

It is contemplated that more than one parameter may be varied within a single chromatographic run. In some cases two (or more) parameters are interdependent. For example, different settings of electron energy for an electron impact ionization source may require different electron emission settings (usually controlled by the filament current) for optimum sensitivity. In this case the method may be extended to discover the optimum value of a combination of two parameters. For example, data from several emission current values may be recorded at each of several values of electron energy. The resultant data contains a two dimensional map of intensity for different electron energies and emission currents at each retention time point which can be interrogated to determine the optimum combination of these parameters for each analyte with respect to its chromatographic elution time.

The invention disclosed herein may use a mass or mobility selective separator and/or filter to minimize or restrict the mass or mobility of ions passing downstream at any given time, thus allowing the range of variation of an operational parameter of a downstream element to be minimized or restricted. For example, the collision energy required for dissociation of ions has been shown to be strongly correlated to the ions mobility. Therefore, if an ion population is ion mobility filtered or separated prior to dissociation by CID the range over which the collision energy needs to be scanned may be varied as a function of the mobility range entering the collision cell. Using a narrow collision energy range maximizes the sensitivity during this experiment.

Similarly, for a mixture of singly charged ions (for example in the analysis of lipids or metabolites), the optimum collision energy is correlated to the m/z of the ions. If a population of ions is filtered or separated with respect to m/z the range over which the collision energy is scanned or varied may be varied as a function of m/z. In addition the m/z of ions eluting from a chromatographic separation is also often correlated with mass or m/z. Capillary electrophoresis is a liquid phase mobility separation technique and the elution of ions of different charge state in solution is also correlated to the required collision energy. Therefore, the range over which the collision energy is scanned may be varied with respect to retention time or as a function of retention time, m/z and ion mobility if several separation techniques are combined.

In some cases a single optimised value at a given retention time cannot be determined, for example, where two target ions co-elute and require different values of the operational parameter. In this case, once the optimum values have been determined a single value resulting in a compromise between the values required for the co-eluting species may be used. Alternatively, the instrument may be configured to use more than one optimum value and the proportion of time that each value is used may be determined using data acquired during the initial analysis.

It is desired in the methods herein that the characteristic separation timescale (e.g. chromatographic peak width) is more than 3 (5, 10 etc.) times the time required for each acquisition period. This ensures that enough data is produced to characterize the chromatographic peak and determine retention time during the initial experiment. State of the art UPLC systems produce chromatographic peaks which are between 1 and 10 seconds wide. Therefore, recording multiple mass spectra at different values of operational parameter during each acquisition period requires an acquisition system capable of recording data at high spectral rates with high duty cycle. Such acquisition systems have been recently developed to record nested IMS-MS data sets and are capable of recording individual mass spectra at rate exceeding 2000 spectra per second. One such acquisition system has been re-purposed to generate the data in the example analysis disclosed herein.

The spectrum in FIG. 2 of the example disclosed herein is generated by collapsing the collision energy dimension data into a single spectrum. This is not a pre-requisite of the method disclosed. Alternatively the data may be processed as full two dimensional data within each time period using a suitable feature detection algorithm.

Although the invention has been described with reference to an orthogonal acceleration time of flight mass spectrometer, other mass analysers may be used. For example, in a discovery proteomics experiment as described, the target peptides, retention time and precursor to product ion transitions and collision energy may be determined using the method described during a DDA experiment. However, it may be desired to perform subsequent quantification using a tandem quadrupole instrument rather than an orthogonal time of flight instrument. The optimum collision energy determined for the time of flight instrument may not be applicable to the tandem quadruple if, for example, the collision gas pressure or composition is different between the two instruments. The target m/z values and retention times will remain the same between the instruments. In this case a MRM method may be set up on the tandem quadrupole using the m/z and retention time information previously determined however the collision energy may be scanned. The intensity data for the precursor to product ion transition monitored may be recorded during each acquisition period or dwell time. This one dimensional, intensity vs collision energy plot recorded for each dwell time during the chromatographic experiment may then be interrogated to determine the preferred value of collision energy for each transition which can be used in subsequent analysis.

The invention claimed is:

1. A method of mass spectrometry comprising:
    a) chromatographically separating compounds in an analytical sample and ionising the eluting sample and/or separating precursor ions, so as to provide temporally separated precursor ions;
    b) mass analyzing precursor ions to obtain precursor ion mass spectral data;
    c) determining from said precursor ion mass spectral data one or more precursor ions for subsequent analysis;
    d) isolating said one or more precursor ions;
    e) fragmenting or reacting said one or more isolated precursor ions to produce product ions;
    f) mass analyzing each of the product ions with a time of flight mass analyser during a plurality of sequential acquisition periods so as to obtain mass spectral data, wherein the value of one or more operational parameter of the spectrometer is varied such that it has different values during the different acquisition periods, and wherein the mass spectral spectral data obtained for a given ion varies depending on the value of said operational parameter;
    g) storing the mass spectral spectral data obtained in each acquisition period along with its respective value of said one or more operational parameter used in obtaining the mass spectral data;
    h) interrogating the stored mass spectral spectral data for at least one of the product ions and determining which of the mass spectral spectral data for that product ion meets a predetermined criterion, and determining the value of each of said one or more operational parameter that provides this mass spectral data as a target operational parameter value; and
    i) mass analyzing again said at least one of the product ions, wherein during this analysis the value of said one or more operational parameter is set to its respective target operational parameter value for said at least one of the product ions.

2. The method of claim 1, wherein the mass spectral spectral data considered to meet said predetermined criterion is the mass spectral spectral data for the product ion that has the greatest intensity or signal to noise ratio.

3. The method of claim 1, wherein the step of chromatographically separating the compounds comprises separating the sample by liquid chromatography; or
    wherein the step of separating precursor ions comprises separating the precursor ions by ion mobility or mass to charge ratio.

4. The method of claim 1, wherein step h) comprises interrogating the mass spectral data for a plurality of product ions of a precursor ion, determining which of the product ions has mass spectral data meeting the predetermined criterion, and determining the value of each of said one or more operational parameter that provides said this mass spectral data as said target value.

5. The method of claim 1, wherein said one or more operational parameter comprises the fragmentation or reaction energy or rate with which the precursor ions are fragmented or reacted to produce the product ions; or the length of time that the precursor ions are subjected to fragmentation of reaction conditions with a reactant.

6. The method of claim 1, wherein the one or more operational parameter is one or more of: a potential difference used to accelerate the ions; a collision energy with which the ions are caused to collide with a gas or surface; a source ionisation efficiency or sensitivity or ionisation energy; an operational parameter of an ion mobility filter, such as compensation voltage in a differential ion mobility filter; a gas pressure or gas composition; a setting of an electrostatic or RF device acting on the ions, such as a tuning parameter; an ion attenuation level; an electron multiplier setting; a mass filter resolution setting such as for optimum signal to noise ratio or sensitivity; or an ion trapping time.

7. The method of claim 1, comprising using a separator device to perform step a); wherein the step of storing the mass spectral spectral data comprises storing the mass spectral spectral data along with its respective elution time from the separator.

8. The method of claim 1, wherein storing the mass spectral spectral data comprises storing the spectral data for the product ions along with their respective precursor ion mass to charge ratio.

9. The method of claim 1, wherein said step of isolating is performed by mass filtering precursor ions or mass selectively ejecting precursor ions from an ion trap, so that only said one or more precursor ions is transmitted for said subsequent analysis.

10. The method of claim 1, comprising repeating steps a) to h) whilst varying different operational parameters so as to determine target operational parameter values for the different operational parameters; and setting the multiple operational parameters to their respective target operational parameter values in step i).

11. The method of claim 1, comprising filtering or separating ions by mass to charge ratio or ion mobility prior to step f) so as to transmit a restricted range of mass to charge ratios or ion mobilities to be mass analysed in step f) at any given time.

12. The method of claim 11, wherein the value of the operational parameter is varied in step b) within a range;

wherein this range is varied with time; wherein said restricted range of mass to charge ratios or ion mobilities is varied with time, optionally in synchronism with the variation of the range of the operational parameter.

13. A method of mass spectrometry comprising:
mass analysing precursor ions to obtain precursor ion mass spectral data;
determining from said precursor ion mass spectral data one or more precursor ions for subsequent analysis;
isolating said one or more precursor ions;
fragmenting or reacting said one or more isolated precursor ions to produce product ions;
mass analyzing the product ions with a time of flight mass analyser during a plurality of sequential acquisition periods so as to obtain mass spectral data, wherein the value of one or more operational parameter of the spectrometer is varied such that it has different values during the different acquisition periods, and wherein the mass spectral spectral data obtained for a given ion varies depending on the value of said operational parameter;
storing the mass spectral spectral data obtained in each acquisition period along with its respective value of said one or more operational parameter used in obtaining the mass spectral data;
interrogating the stored mass spectral spectral data for at least one of the product ions and determining which of the mass spectral data for that product ions meets a predetermined criterion, and determining the value of each of said one or more operational parameter that provides this mass spectral data as a target operational parameter value; and
mass analyzing again said at least one of the product ions, wherein during this analysis the value of said one or more operational parameter is set to its respective target operational parameter value for said at least one of the product ions.

14. A mass spectrometer configured to perform the method of claim 1.

15. The method of claim 1, comprising:
using a separator device to perform step a);
determining multiple different optimized fragmentation energies for producing a plurality of respective fragment ions from a precursor ion; and
varying the fragmentation energy that the precursor ion is subjected to between the optimized fragmentation energies as the precursor ion elutes from the separator.

16. The method of claim 1, wherein step g) further comprises:
determining, from said product ions mass spectral data, one or more product ions for subsequent analysis, wherein the mass spectral data obtained in each acquisition period is collapsed into a single spectrum such that determining one or more product ions for subsequent analysis does not depend on the value of said one or more operational parameter used in obtaining the mass spectral data; and
determining, from the one or more precursor ions and the one or more product ions for subsequent analysis, one or more precursor-product ion combinations for subsequent analysis; and
wherein step i) comprises mass analyzing again said one or more precursor-product ion combinations.

17. The method of claim 16, wherein comprising excluding a precursor-product ion combination from said one or more precursor-product ion combinations for subsequent analysis if the mass spectral data of the product ion of said precursor-product combination does not meet the predetermined criterion.

* * * * *